No. 747,920. PATENTED DEC. 22, 1903.
H. PASSOW.
CEMENT AND PROCESS OF PRODUCING SAME.
APPLICATION FILED MAY 13, 1903.
NO MODEL. 3 SHEETS—SHEET 1.
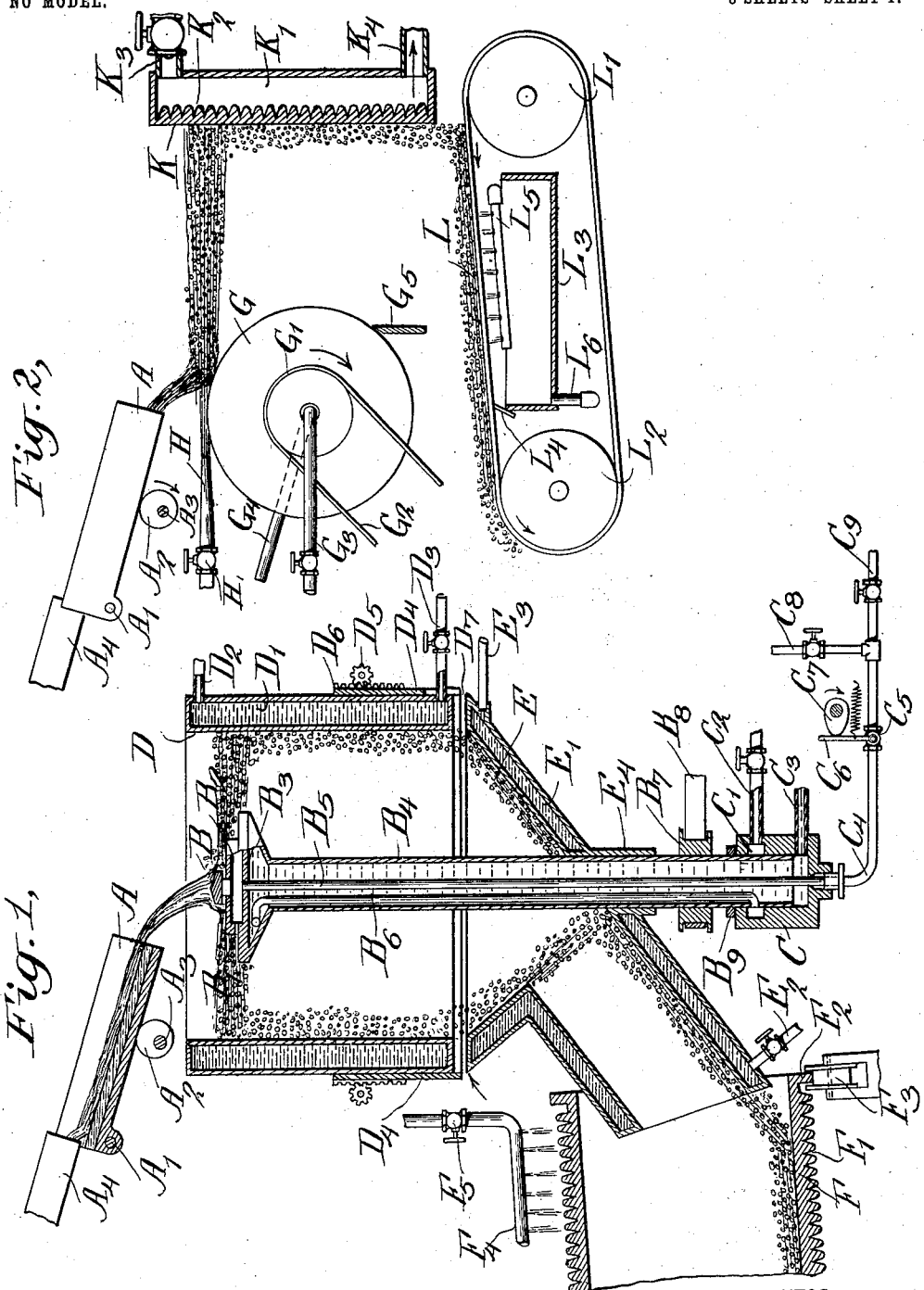
WITNESSES: Hermann Passow INVENTOR
BY
Duncan & Duncan ATTORNEYS

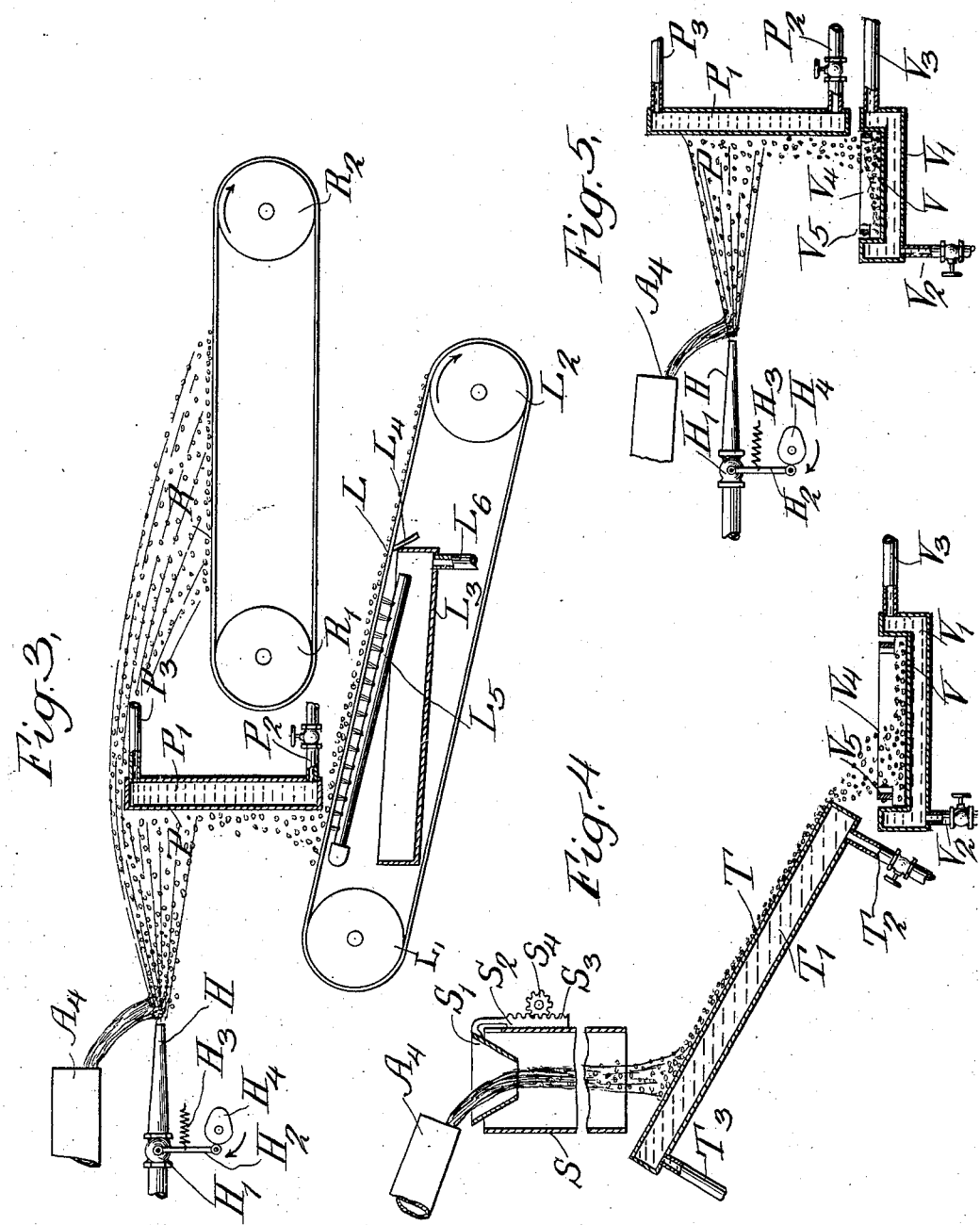

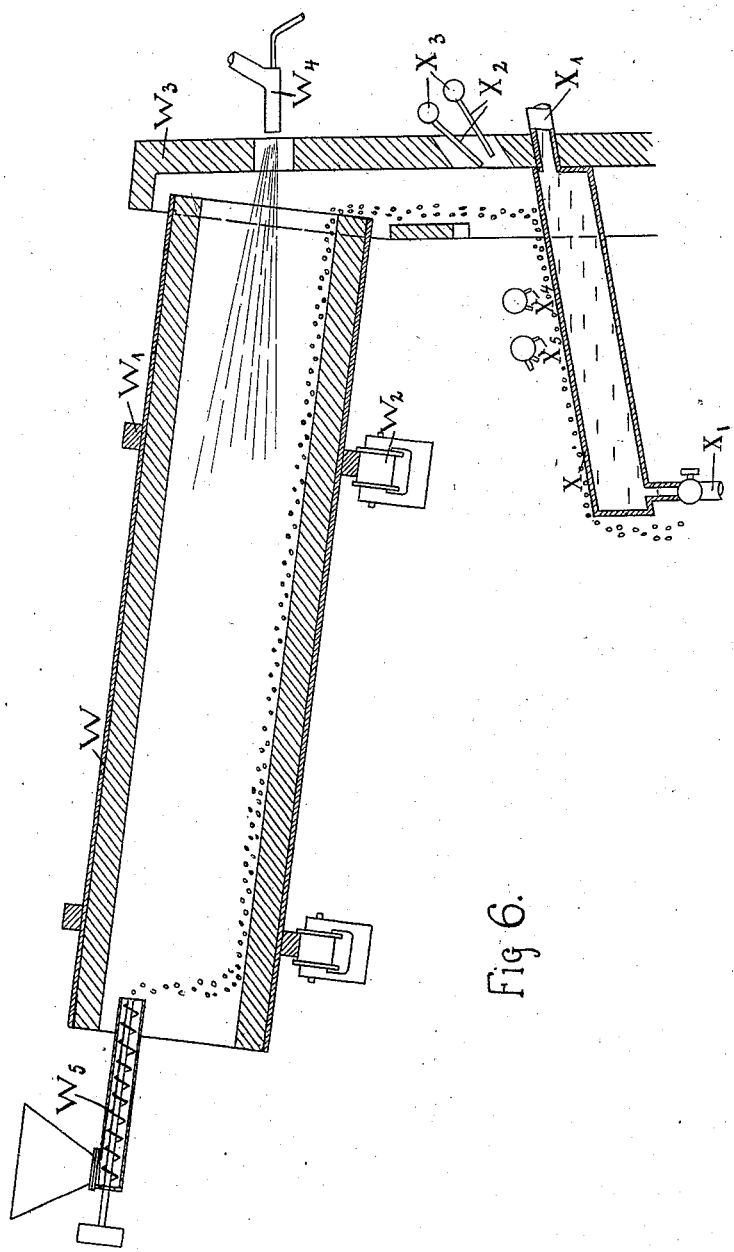

No. 747,920.                                                                 Patented December 22, 1903.

UNITED STATES PATENT OFFICE.

HERMANN PASSOW, OF HAMBURG, GERMANY, ASSIGNOR TO HENRY EDMUNDS, OF LONDON, ENGLAND.

CEMENT AND PROCESS OF PRODUCING SAME.

SPECIFICATION forming part of Letters Patent No. 747,920, dated December 22, 1903.

Original application filed January 6, 1903, Serial No. 138,060. Divided and this application filed May 13, 1903. Serial No. 156,917. (No specimens.)

*To all whom it may concern:*

Be it known that I, HERMANN PASSOW, a subject of the Emperor of Germany, and a resident of Hamburg, Germany, have invented certain new and useful Improvements in Cement and Processes of Producing the Same, of which the following is a specification, taken in connection with the accompanying drawings, which form a part of the same.

This invention relates to cement and the process of producing the same, and relates especially to the cement formed of a mixture of active and inert cement material and to the process of treating furnace-slag to produce such active and inert materials.

In the accompanying drawings, in which the same reference character refers to similar parts in the several figures, Figure 1 is a vertical sectional view of one form of apparatus for carrying out this invention. Fig. 2 is a similar view showing another modification. Figs. 3, 4, 5, and 6 show still further modified forms of apparatus in substantially vertical section.

In the means for carrying out this invention shown in Fig. 1 the heated furnace-slag may be fed as desired from the slag-chute A, and this chute is indicated as preferably movably mounted by means of the chute-pivot A'. The chute-cam $A^2$ may be employed, if desired, to give a movement to the slag-chute, and this cam may be revolved as desired by the cam-shaft $A^3$ indicated. It will be evident that if this movable slag-chute is employed the heated slag, which may, if desired, be in a molten condition, is fed into the chute by the feeder $A^4$ and is supplied from the lower end of the chute in a regulated and pulsating manner under the action of the movable chute. If desired, of course the chute may be maintained stationary during the operation of the apparatus, under which condition the heated slag would be more regularly supplied by the chute to the cooling disintegrating means which subsequently act upon it.

Cooling means in the form of a rotary disintegrator may be used if desired, and the heated slag may be allowed to fall upon this disintegrator, which may take the disk form indicated in Fig. 1, the head B of the disintegrator being indicated as having the stepped formation, which it may take if desired. The head is preferably formed with the chamber $B^2$, formed by the diaphragm $B^3$, and suitable jet-holes B' are also preferably provided, as indicated, these jet-holes communicating with the chamber $B^2$, which is supplied with fluid under pressure by the jet-pipe $B^5$. The disintegrating-head is carried upon the tubular spindle $B^4$, revolubly mounted in a suitable sleeve $E^4$ and having its end supported in the spindle-bearing C, the collar $B^9$ on the spindle maintaining it at the proper height. This spindle may be rotated at any desired rate by the pulley $B^7$, secured to it, which is driven in the ordinary manner by the belt $B^8$. By suitably varying the speed of the spindle the disintegrating and cooling effects of the head are correspondingly varied. The disintegrator may, if desired, be cooled by suitable circulation, which in the form illustrated is effected by the cooling-pipe $B^6$, preferably having its upper end outwardly curved, as indicated, to distribute the cooling fluid within the space on the under surface of the diaphragm and having its lower end communicating through a suitable opening in the spindle with the annular recess C' in the spindle-bearing, this recess being supplied by the cooling fluid through the valved pipe $C^2$, by which the amount of this fluid may be suitably regulated. The cooling fluid is discharged from the lower end of this spindle by the fluid-discharge pipe $C^3$ indicated. The lower end of the jet-pipe $B^5$, which supplies the fluid for the jets issuing from the jet-holes B', communicates with a suitable stuffing-box at the lower end of the spindle-bearing. The pipe $C^4$, connected with this stuffing-box, is provided with the jet-valve $C^5$, which governs the amount of fluid entering the pipe, this valve being preferably automatically regulated by any desired means—such, for instance, as the valve-lever $C^6$—which may be spring-pressed against the cam $C^7$, as indicated. This cam may be rotated, if desired, to give a periodic variation to the fluid passing through the jet-pipes to produce suitable pulsating jets to act upon the slag cement material. The two valved jet-supply pipes $C^8$ $C^9$ supply the desired fluid—such as air, steam, gas, water, or other liquid—in the desired proportions, so as to give the proper action of the jets upon the heated slag. After being acted upon by the first cooling means, such as the rotary disintegrator, the slag or cement material is projected or thrown outward through the cooling medium around the disintegrator, which preferably contains oxygen and which operates to cool the slag and also to improve its quality. Thereafter the slag may, if desired, be subjected to a further cooling by coming in contact with the subsequent cooling means—such, for instance, as a cooling-surface—which may take the form of the casing D indicated. The temperature of this casing is preferably regulated by the employment of the cooling-jacket $D'$, which is supplied with cooling fluid by the valved pipe $D^3$, the cooling fluid issuing from the jacket through the pipe $D^2$. By this means the circulation of cooling fluid in the cooling-jacket regulates in a well-known manner the temperature of the cooling-surface or casing D, so that material impinging upon this casing is cooled in a regulated manner as desired.

Still further cooling means may be provided which may take the form of a cooling-surface, such as the guide E. In the form indicated this guide has the conical or funnel-shaped top communicating with the casing, the lower end serving to collect and guide the cement material, as indicated. This cooling-surface is also preferably regulated in its temperature by means of the cooling-jacket $E'$ supplied with cooling fluid in regulated amounts by the valved supply-pipe $E^2$, the fluid passing out through the discharge-pipe $E^3$.

Still further cooling means in the form of a cooling-surface, such as the rotary conveyer F, may be used. This conveyer in Fig. 1 is indicated as having a cylindrical form and as being provided with a corrugated or finned outer surface $F'$. The spray-pipe $F^4$ may be used in connection with this conveyer, the supply of cooling fluid being regulated by the valve $F^5$. This conveyer is indicated as supported upon friction-wheels, such as $F^3$, which provide for its rotation at any desired rate. The supply of air or other medium in which the cooling takes place may be regulated to produce the desired result upon the slag or cement material. In Fig. 1 the draft-opening $D^7$ is indicated, through which the cooling medium may enter the casing. This draft-opening is controlled by the collar $D^4$, which may be adjusted by the pinions $D^5$, which coöperate with suitable racks $D^6$ on the collar. In this way the supply of air or other cooling medium is controlled and the amount of oxygen in which the disintegration and cooling of the slag preferably takes place is suitably regulated. It is of course not necessary to employ all of the series of cooling means which have been described, and parts of this apparatus may thus be omitted by those familiar with this art.

In the embodiment of the apparatus indicated in Fig. 2 a similar movable slag-chute A may be employed, movably mounted about the chute-pivot $A'$ and given a periodic movement, if desired, by the chute-cam $A^2$, rotated by the shaft $A^3$, as indicated. The feeder supplies the heated slag to this slag-chute, and the heated slag thus falls in a regulated manner to be acted upon by the subsequent cooling means.

In Fig. 2 the cooling means is indicated as having the form of a rotary cooling-drum or disintegrator G, rotated at any desired speed by the belt $G^2$, passing over the pulley $G'$. A suitable scraper $G^5$ may be employed, if desired, to clean the surface of the drum when necessary. The temperature of the cooling-drum may be regulated during its operation by the valved fluid-supply pipe $G^3$, by which a suitable supply of cooling fluid is circulated through the drum and issues from the discharge-pipe $G^4$. The heated furnace-slag falling upon the periphery of the cooling-drum G is disintegrated in an obvious manner and is thrown outward to be subsequently acted upon by further cooling means. If desired, the disintegrator may be used in connection with the jet-nozzle H, which supplies a suitable cooling disintegrating fluid jet which may act upon the slag in connection with the rotary disintegrator. The force of the jet is regulated in a well-known way by the jet-valve $H'$, by which a jet of the desired force of air, steam, gas, or other fluid may be supplied.

The subsequent cooling means acting upon the slag or cement material may take the form of the cooling-surface K, which in Fig. 2 is indicated as placed so that the slag or cement material impinges upon it. It is understood, of course, that the cooling-surfaces of this description are preferably formed of suitable heat-conducting material, such as metal, to give the proper cooling action and to properly regulate the cooling of the material. The temperature of this cooling-surface is suitably regulated by the cooling-jacket $K'$, into which cooling fluid is admitted by the valved supply-pipe $K^3$, and operates, in connection with the corrugated inner surface $K^2$, to regulate the temperature of the cooling-surface K. The cooling fluid, which may be air, steam, gas, or other fluid, passes out through the discharge-pipe $K^4$.

If desired, the slag or cement material may subsequently be treated by further cooling means, which may take the form of a conveyer, a belt conveyer L being indicated in Fig. 2, which is preferably formed of a suitable metal belt mounted upon the pulleys $L'$ $L^2$, which are rotated by any desired means to give the requisite movement to the conveyer or cooling-surface. The temperature of this cooling-surface is regulated by any desired means, such as the sprayer $L^5$, by which the jets of cooling fluid are discharged against the conveyer. A scraper $L^4$ may be used, and the surplus fluid, if a liquid is used, may be taken off by the trough or tank $L^3$, which collects the material and leads it into the discharge-pipe $L^6$.

In the form of apparatus indicated in Fig. 3 the heated slag is indicated as being supplied at the rate desired by the chute $A^4$. This heated slag is operated upon by suitable cooling means, the primary cooling means having in the form indicated a disintegrating action and consisting of a suitable cooling and disintegrating jet of fluid. This jet issues from the jet-nozzle H and is controlled by the jet-valve H'. This jet-valve may be constantly maintained in one position or, if desired, may be given a periodic motion by any desired means to give a regular variation to the jet. In the form indicated the jet-valve is provided with a suitable lever $H^2$, held by the spring $H^3$ against the jet-cam $H^4$. This cam when revolved at the desired rate gives in an obvious manner a pulsating jet of any cooling fluid—such as air, gas, steam, or other fluid—and this jet operates upon the heated slag material to suitably cool and disintegrate the same. This slag or cement material may be subsequently operated upon by further cooling means, which may, if desired, be suitably regulated to control the rate of cooling of the slag and its subsequent condition, and also, if desired, the cooling means may be diversely operating, and different portions of the slag or cement material may be treated simultaneously by these diversely-operating cooling means. The cooling means may take any desired form. A suitable cooling medium—such as an atmosphere of air, gas, steam, or other fluid—may be employed which cools the slag or cement material when in a disintegrated condition in an obvious manner, and the action of such cooling medium is obviously regulated by the length of time which the slag or cement material remains within the cooling medium. The cooling means may take the form of suitable cooling-surfaces, preferably of regulated temperature, to correspondingly regulate the rate of cooling and the condition of the slag or cement material.

A suitable cooling-surface P may be used, this surface being preferably provided with a cooling-jacket P', supplied by a suitable cooling fluid through the valved inlet $P^2$, the cooling fluid issuing through the discharge-pipe $P^3$. This cooling-surface may, if desired, be so placed as to only partially intercept the slag or cement material, so that portions of the same impinge upon the surface and are cooled thereby, while other portions which do not impinge upon this cooling-surface are acted upon during a longer time while passing through the cooling medium in which they are suspended.

Subsequent cooling means may be employed to regulate the further cooling of the slag or cement material. In the form indicated the material which impinges upon the surface P is further treated by cooling means which may take the form of the cooling-surface or belt conveyer L, upon which the material falls and by which it is subsequently cooled, the temperature of the cooling-surface and the corresponding action upon the material being preferably regulated by the spray-pipe $L^5$, by which cooling-jets act upon the cooling-surface. A scraper $L^4$, trough $L^3$, and discharge-pipe $L^6$ may, if desired, be employed so that the conveyer, which preferably is in the form of a metal belt mounted upon the pulleys L' $L^2$, which are suitably rotated continuously, cools the material at a regulated rate.

In the form indicated the portion of the slag or cement material which does not impinge upon the cooling-surface P is shown as passing a considerable distance beyond such surface through the atmosphere or cooling medium in which it is suspended and subsequently falls upon another cooling-surface, which may take the form of a metal belt conveyer, which is indicated as mounted upon the rotating pulleys R' $R^2$. It is apparent that in this manner the different portions of the slag or cement material are subjected to the action of diversely-operating cooling means, so that the different portions are cooled at regulated rates in a different manner to produce correspondingly-different results, as desired.

In the embodiment of this apparatus indicated in Fig. 4 the heated slag is supplied at the rate desired by the slag-chute $A^4$ and is subsequently subjected to disintegrating and cooling action by the operation of a series of cooling means. The tower S may be provided through which the slag is allowed to fall and by which it is disintegrated and cooled in a manner similar to the operation of the well-known shot-tower. This tower may of course be given any desired height to produce the proper disintegrating and cooling effect. The cooling means operating upon the slag or cement material may be regulated, as desired, and a draft-funnel S' may be used to regulate the temperature of the cooling medium or fluid through which the slag falls, this draft-funnel being adjustable in position by the stem $S^2$, which is provided with the rack $S^3$ on the end of the same, this rack being engaged by a suitable pinion $S^4$, by which the movement, and consequent temperature, of the cooling medium may be regulated in an obvious manner. Subsequent cooling means, such as a cooling-surface T, may operate upon the slag or cement material, the surface T being indicated as in the form of an inclined slide, so as to suitably direct the material along the surface of the same. The temperature of this cooling surface or slide is preferably regulated by employing a suitable cooling-jacket T', cooling material being supplied to the jacket by the valved inlet T² and being discharged therefrom by the pipe T³.

The material may be subsequently acted upon by cooling means, which may take the form of a conveyer, as indicated in Fig. 4, this conveyer consisting of the trough V with a suitable cooling-jacket V' supplied by the valved supply-pipe V² and the cooling fluid issuing through the pipe V³. A series of suitable scrapers, such as V⁴, may be mounted upon any means, such as a chain V⁵, to move the slag or cement material along the conveyer-trough.

Another embodiment of this apparatus is indicated in Fig. 5, in which the heated slag may be supplied in regulated quantity and in a fluid state, if desired, by the slag-chute A⁴. This slag is subsequently operated upon by disintegrating and cooling means, which may take the form of a disintegrating and cooling jet of air, gas, steam, or water, or a mixture of the same issuing from the jet-nozzle H and controlled by the automatic valve H', having the operating devices similar to those described in connection with Fig. 3 to produce a variable or pulsating jet. This jet disintegrates the heated slag and projects it in an obvious manner, as indicated through the cooling medium in which it is suspended for an appreciable time.

The slag or cement material may, if desired, be subsequently treated by the action of suitable cooling means, which may take the form of a cooling-surface P. This cooling-surface is preferably provided with a suitable water-jacket P', which operates to regulate its temperature, the cooling fluid being introduced through the valve-pipe P² and issuing through the pipe P³. Subsequent cooling means, which may take the form of the conveyer V, may be used to regulate the further cooling of the slag or cement material. The conveyer V is in the form of a jacketed trough, in which a suitable conveyer operates similarly to the conveyer described in connection with Fig. 4, the parts corresponding in this instance.

The operation of this process in the treatment of furnace-slag to convert the same into cement material is substantially as follows: The furnace-slag, which is treated in this apparatus, may be the ordinary furnace-slag such as is produced by blast-furnaces or other iron and metallurgical furnaces in their usual operation and which is ordinarily discarded as a worthless by-product. Materials may, however, be specially melted in furnaces for conversion into cement material by this apparatus, if desired. The slag is preferably melted and supplied to this apparatus in a fluid condition, although that is not necessary in all cases. The slag should, however, be suitably heated before being subjected to this apparatus, which controls the cooling of the same and its conversion into cement material. It is not necessary that the proportions of the various ingredients of the slag treated in this apparatus shall correspond exactly to the proportions of the materials which constitute the Portland cements. Ordinary blast-furnace slag is usually considerably lower in its lime contents than is considered necessary for Portland cement. The cement material produced by this apparatus from such underlimed furnace-slags has, however, when ground valuable hydraulic properties, sets properly, and, furthermore, forms a good cementitious material, although the addition of a small percentage of Portland cement or other material may be desirable in order to render the cementitious material produced by this apparatus from furnace-slag more quick setting. Heated furnace-slag when in fluid condition, as is preferably the case, may be supplied in a pulsating stream from the movable slag-chute A, (shown in Fig. 1,) or, if desired, the slag-chute may be stationary. This stream of fluid slag falls upon the rapidly-rotating disintegrating-head B and is disintegrated and simultaneously cooled by contact with the same and also acted upon by the jets of fluid, which may be employed in connection with the rotary disintegrator. If the character of the stream of molten slag is properly adjusted in connection with the disintegrator and the rate of revolution of the same, the slag falling upon the various parts of the disintegrator is diversely acted upon and the different portions are thus given a different character and are projected through the air or other cooling medium, which preferably contains oxygen and are subsequently cooled at such regulated rates in the subsequent apparatus employed that when properly ground they constitute a cementitious material of the character which has been set forth. The other embodiments of this apparatus operate in a substantially similar manner upon the furnace-slag, which is preferably in a fluid condition when submitted to the apparatus and may be so adjusted and operated that a material is produced having such properties and proportions that when ground and properly mixed with water a highly cementitious material is the result. If desired, however, this apparatus may be so regulated and operated that the heated slag is disintegrated and cooled in such a regulated manner that a more uniform product is the result. It is possible—for instance, using the apparatus indicated in Fig. 1—to adjust the slag-chute so that the furnace-slag shall be supplied to the disintegrator in a more uniform manner—for instance, by allowing the chute to remain stationary. This disintegrator may be rotated with a constant speed and the fluid jets which may be used in connection therewith may operate in a constant manner so that the treated and disintegrated material is projected outward by this portion of the apparatus through the cooling medium and collects in particles having more nearly uniform structure and size. This slag or cement material as it passes through the subsequent portions of the apparatus is cooled at a regulated rate and in a comparatively uniform manner, so that a cooled slag or cement material is produced which is of more constant character.

If the disintegrator is operated with comparatively low-pressure fluid jets and also preferably with lower rotative speed and using a small amount of water or steam with the other fluid of the jets, the rate of cooling of the material may be so regulated that comparatively pure active or pumice material is produced. This material usually is produced in spongy or porous masses formed of particles that come together while still plastic by reason of the proper regulation of the various cooling means, these disintegrated particles being cohered in this way. The disintegrating apparatus illustrated in Fig. 1 may, however, be operated so as to produce nearly pure glassy or inert material by suitably regulating the various cooling means. This may be accomplished by employing fluid jets of higher pressure and preferably by using a higher speed. In producing the glassy material under ordinary circumstances the particles are usually so cooled that they do not aggregate so much as the particles of active material. In regulating the cooling of material of this nature it is of great advantage to disintegrate it as regularly as possible if it is to be cooled uniformly, since the separation of the heated material into small particles makes the cooling of the outside and interior portions of the particles more nearly uniform. The active and also the glassy material may be produced in a similar manner in the other forms of apparatus described by suitably regulating the apparatus in each instance to cause the desired disintegration and cooling of the slag. The process may be carried out so that active slag cement material shall constitute practically any desired proportion of the product up to substantially the whole of the same, and in referring to the production of portions of active material it is intended to indicate that active material forms a substantial proportion of the product of the whole of the same. In producing cement material from slag the rate of cooling should not be so slow that decrepitation will take place in the product. Such decrepitated slag material or slag meal is comparatively valueless for cement purposes.

An important test of the existence of the proper regulation of the pressure of the cooling jet or jets or of the existence of the proper temperature and position of the cooling surfaces or apparatus and generally of the existence of the proper rate of cooling to produce active or pumiceous material is the fact that the particles of the material as it is cooled will cohere together or form coherent masses or aggregations against the surfaces of the cooling media or otherwise. Also an important test of the existence of the proper regulation of the jets and the temperature or position of the cooling-surfaces to produce inert material is to be found in observation of the condition of such material. If it assumes the glassy form, the regulation to produce inert material will be found to be proper.

It is not necessary in all cases that one form of apparatus be used for producing one kind of cement material and that the same apparatus be used with a different regulation for producing the other kind of cement material. The two kinds of cement material, which are preferably produced separately and ground and mingled in the desired proportions to produce cementitious material, may be produced in apparatus having different forms, if desired. Furthermore, as has been explained, it is possible to produce both kinds of material simultaneously in the proper proportions for immediate grinding and utilization as a cementitious material. The apparatus indicated in Fig. 3 shows such a device, and with the proper regulation and operation of the various portions of this apparatus a glassy or inert cement material may be collected upon one of the conveyers and the pumice or active cement material may be collected upon the other, the slag being simultaneously operated upon by diversely-acting cooling means, which regulate the rates of cooling of the different portions of disintegrated material. It is not necessary in all cases to form these cement materials from liquid slag, as has been described. They may be formed by heating cooled slag, such as water-granulated slag, and by properly regulating the time that the heated slag remains within the critical temperature zone. Active cement material may be produced by heating water-granulated slag until it is brought within the critical range of temperature, which with ordinary blast-furnace slag having about fifty per cent. of lime extends from approximately 950° to 1,250° centigrade, when the slag usually becomes plastic. The slag after being brought into this critical plastic condition is preferably quickly cooled by a fluid blast, which acts upon the various parts of the mass of heated slag, and active cement material is produced. The cooling of the heated slag should preferably be rapid, as described, in order to prevent the decrepitation of the slag. The length of time that the slag remains within the critical temperature zone may be regulated not only by the rotary disintegrating apparatus described, which by regulating the cooling of the liquid slag regulates the time required to carry it through the critical plastic condition, but also by any other means by which it is maintained in the critical-temperature zone for the proper length of time. Water-granulated slag may be heated in crucibles, in which it is preferably suitably stirred, or in any other way in a suitable furnace to the critical temperature and then may be quickly cooled to form active cement material. Fig. 6 indicates an inclined rotary kiln or roaster W, preferably lined with fire-brick or similar material, in which water-granulated slag may be treated in the desired manner and which can be readily heated by an internal jet of fuel—such as oil, powdered coal, or gas—supplied by the burner $W^4$ and entering the kiln at the lower end. The slag in the form of water-granulated slag or otherwise may be fed into the upper end of the kiln by any desired means, such as the conveyer $W^5$. The kiln-jacket is formed with the rings $W'$, which are supported, as indicated, by the friction-rolls $W^2$, so that by rotating the rolls the kiln may be slowly revolved at the desired rate. The slag is thus fed slowly down the kiln and is gradually heated therein to the critical plastic temperature. Ordinary blast-furnace slag may be raised to about 1,000° centigrade. This heated slag falls from the lower end of the kiln upon the plate X, of iron or other material, which may be cooled, if desired, by a fluid-jacket, a cooling fluid being indicated as circulating through the pipes $X'$. The slag is preferably quickly cooled by contact with the plate X and by the action of the fluid-jets of air, steam, water, or gas which may issue from one or more of the jet-pipes $X^2$, $X^3$, $X^4$, and $X^5$, by which the material may be broken up and moved down the plate to the lower end of the same. In some cases, however, the heated slag from this roaster or kiln may be cooled by other means, as by dropping it into water, preferably for a short time, after which it may be suitably dried. It is of course understood that the degree of heat must be suitably regulated to give the critical temperature with the particular slag to be treated, since the critical temperature may vary with slags of different composition.

Inert or glassy slag may be readily produced by quickly cooling heated liquid slag by contact with water by pouring the slag into water or otherwise to form water-granulated slag and by suitably drying the same to expel the absorbed water. Drying to about 200° centigrade is usually sufficient for this purpose and may be effected in any desired apparatus, such as an inclined rotary drier of well-known construction, which may be similar to the roasting-kiln shown in Fig. 6, through which the slag is passed. If desired, the active and inert cement materials may be simultaneously produced from some kinds of water-granulated slag by heating a mass of slag in crucibles in a crucible-furnace or in any other suitable furnace until the whole mass of slag has been brought up to the critical temperature. A portion of this slag may then be heated above the critical-temperature zone, when it usually becomes fluid by locally heating part of the slag in any way, as by an intense heat acting upon it. In the apparatus shown in Fig. 6 a local heating of the material falling from the mouth of the kiln could be effected by a suitably-arranged neighboring jet. This mass of diversely-heated slag may be quickly cooled by fluid-jets or otherwise, when if the time during which the various parts of the material remain within the critical-temperature zone has been properly regulated a mixture of the proper proportions of inert and active cement materials will result. The portion of the slag which was heated beyond the critical-temperature zone will by this sudden cooling be brought quickly through such zone to form inert material, while the other portion of the slag will be turned into active cement material, as described.

In treating water-granulated slag or similar material the heating should be properly regulated, so that the slag material is not heated up to a temperature that for several kinds of slag treated lies between about 500° and 900° centigrade and then allowed to cool to ordinary temperature. Such a heating and cooling is liable with some kinds of slag to form an undesirable product or slag-refuse that is weak, powdery, and comparatively worthless. The active or pumice material produced from liquid slag has the same desirable properties as the active material formed by roasting water-granulated slag as described. In like manner the glassy or inert cement material produced from liquid slag by the disintegrating apparatus described is likewise similar as a cement material to dried water-granulated slag. Both are inert slag materials.

When the active and inert cement materials have been produced, they are suitably ground and mixed, and a hydraulic cementitious material is the result. These inert and active cement materials produced from furnace-slag, as has been described, seem to have different properties, as is indicated by the usual rise of temperature manifested when carbon dioxid is passed over ground, moistened, and compressed active cement material of this character, while such a rise of temperature does not occur when ground, moistened, and compressed inert cement material is treated with carbon dioxid. This active cement material seems to have a crystalline structure, as indicated by its polarizing action, while the glassy material seems to have a vitreous or non-crystalline structure, since it does not polarize light. These two materials when properly ground and mixed together, preferably in about equal proportions, form a most valuable cementitious material. In some cases this cementitious material may, however, be made more quickly-setting, if desired, by the addition of a small proportion, preferably, of Portland cement, although other cementitious material may be used for this purpose. The time of setting of this material may be further regulated by the addition of a small proportion of gypsum, plaster-of-paris, or similar material, one or two per cent. of which may be added either in connection with the Portland cement or otherwise to regulate the setting time of the product, as desired.

This application is a division and continuation of my former United States Patent, application Serial No. 138,060, filed January 6, 1903, and relates to improvements on the cement and process forming the subject-matter of my former United States patent, application Serial No. 122,589, filed September 8, 1902.

It will of course be understood that those familiar with this art may make many variations in the forms, proportions, and numbers of elements of the apparatus which has been described. Furthermore, corresponding variations may be made in the number, nature, and order of the steps of the processes described without losing the advantages of the invention. I do not, therefore, wish to be limited to the details of the disclosure which I have made in this case.

What I claim as new and what I desire to secure by Letters Patent is set forth in the appended claims:

1. The cement process which consists in disintegrating highly-heated furnace-slag into particles, in projecting the same through a cooling fluid into impingement upon a surface and in cohering the same.

2. The cement process which consists in disintegrating highly-heated furnace-slag into particles, in cohering said particles and in regulating the time said slag remains within the critical-temperature zone.

3. The cement process which consists in disintegrating molten furnace-slag into particles, in causing the impingement of the same upon a surface while in a plastic condition and in cohering the same upon said surface.

4. The cement process which consists in causing particles of highly-heated furnace-slag to impinge upon a surface and in cohering said particles.

5. The cement process which consists in aggregating separated particles of highly-heated furnace-slag upon a surface and in regulating the cooling of the same so as to form a material containing substantial proportions of active cement material.

6. The cement process which consists in aggregating disintegrated particles of highly-heated furnace-slag and in regulating the time said furnace-slag remains within the critical-temperature zone so as to form a material containing substantial proportions of active cement material.

7. The cement process which consists in disintegrating molten furnace-slag into particles, in causing the same to impinge upon a surface and in regulating the time said slag remains within the critical-temperature zone so as to form a material containing substantial proportions of active cement material.

8. The cement process which consists in disintegrating highly-heated furnace-slag into particles and in projecting the same through a fluid so as to form a material containing substantial proportions of active cement material.

9. The cement process which consists in subjecting molten furnace-slag to the action of fluid-jets to disintegrate the same and in projecting said slag through a fluid so as to form a material containing substantial proportions of active cement material.

10. The cement process which consists in forming highly-cementitious material comprising substantial proportions of active and inert cement materials formed by bringing furnace-slag to a molten condition, in disintegrating the same into particles, in projecting particles thereof through a fluid and in slowly cooling the same so as to form said active cement material and in projecting the particles thereof through a fluid and in quickly cooling the same so as to form inert cement material.

11. The cement process which consists in bringing furnace-slag to a molten condition, in disintegrating and in slowly cooling the same so as to form active cement material, in bringing furnace-slag to a molten condition, in disintegrating and in quickly cooling the same so as to form inert cement material and in mixing substantial proportions of said active and inert cement materials to form a highly-cementitious material.

12. The cement process which consists in bringing slag material to a highly-heated condition, in disintegrating and in slowly cooling the same so as to form active cement material, and in mixing substantial proportions of said active material and inert slag cement material to produce a highly cementitious material.

13. The cement process which consists in bringing furnace-slag to a molten condition, in disintegrating and in slowly cooling the same so as to form a material containing substantial proportions of active cement material.

14. The cement process which consists in disintegrating highly-heated furnace-slag and in diversely projecting the same through a cooling fluid so as to produce active and inert cement materials.

15. The cement process which consists in disintegrating highly-heated furnace-slag and in diversely subjecting the same to the action of relatively moving fluid while suspended therein so as to produce active and inert cement materials.

16. The cement process which consists in mixing active slag cement material, inert slag cement material, independently-cementitious material and calcium sulfate.

17. The cement process which consists in mixing highly-cementitious material having substantially the same chemical composition as furnace-slag, formed from said slag without the addition of other material, and calcium sulfate.

18. The cement comprising active slag cement material, inert slag cement material, independently-cementitious material and calcium sulfate.

19. The cement comprising highly-cementitious material having substantially the same chemical composition as furnace-slag, formed from said slag without the addition of other material, independently-cementitious material and calcium sulfate.

20. The cement comprising active slag cement material, inert slag cement material and calcium sulfate.

21. The cement comprising highly-cementitious material having substantially the same chemical composition as furnace-slag, formed from said slag without the addition of other material, and calcium sulfate.

HERMANN PASSOW.

Witnesses:
HARRY L. DUNCAN,
E. H. L. MUMMENHOFF.